US012551229B2

(12) United States Patent
Intintoli et al.

(10) Patent No.: US 12,551,229 B2
(45) Date of Patent: Feb. 17, 2026

(54) INTEGRATED ENDOSCOPIC LIGAMENT RELEASE DEVICE WITH DUAL HANDLES

(71) Applicant: Trice Medical, Inc., Malvern, PA (US)

(72) Inventors: Alfred J. Intintoli, West Chester, PA (US); Richard T. Briganti, Bala Cynwyd, PA (US)

(73) Assignee: Trice Medical, Inc., Malvern, PA (US)

( * ) Notice: Subject to any disclaimer, the term of this patent is extended or adjusted under 35 U.S.C. 154(b) by 439 days.

(21) Appl. No.: 18/162,933

(22) Filed: Feb. 1, 2023

(65) Prior Publication Data

US 2023/0240699 A1 Aug. 3, 2023

Related U.S. Application Data

(60) Provisional application No. 63/305,474, filed on Feb. 1, 2022.

(51) Int. Cl.
*A61B 17/32* (2006.01)
*A61B 1/05* (2006.01)
*A61B 17/00* (2006.01)

(52) U.S. Cl.
CPC ........ *A61B 17/320036* (2013.01); *A61B 1/05* (2013.01); *A61B 2017/00238* (2013.01)

(58) Field of Classification Search
CPC ...... A61B 17/00008; A61B 17/320016; A61B 17/320036; A61B 2017/00238; A61B 2017/00367; A61B 2017/00424; A61B 2017/00446; A61B 2017/32004; A61B 2017/320044; A61B 2017/320052; A61B 2017/320056; A61B 1/00042; A61B 1/00087; A61B 1/05; A61B 2090/3614
See application file for complete search history.

(56) References Cited

U.S. PATENT DOCUMENTS

| 5,029,573 | A | 7/1991 | Chow |
| 5,273,024 | A | 12/1993 | Menon et al. |
| 5,306,284 | A | 4/1994 | Agee et al. |
| 5,549,623 | A | 8/1996 | Sharpe et al. |
| 5,578,051 | A | 11/1996 | Mirza |
| 5,582,575 | A | 12/1996 | Heckele et al. |
| 5,649,946 | A | 7/1997 | Bramlet |
| 5,651,790 | A | 7/1997 | Resnick et al. |
| 7,780,690 | B2 | 8/2010 | Rehnke |

(Continued)

FOREIGN PATENT DOCUMENTS

WO WO 2015/171785 A1 11/2015

*Primary Examiner* — Robert A Lynch (74) *Attorney, Agent, or Firm* — Knobbe, Martens, Olson & Bear LLP (57) ABSTRACT

Surgical instruments and methods of minimally invasive surgery are provided. The device may include two proximal handles each sized for a surgeon's hand, the two handles in fixed relative positions, and a distal probe attached to the handles. The probe can include a distal cutting member and contain or receive an imaging device. The system can be used for cutting anatomic members, such as ligaments, during minimally invasive surgical procedures, for example, performing endoscopic ligament release surgery, such as carpal tunnel release, plantar fasciotomy, gastrocnemius release, cubital tunnel release, and tarsal tunnel release surgery, and similar surgical procedures on anatomic members.

20 Claims, 9 Drawing Sheets

(56) References Cited

U.S. PATENT DOCUMENTS

| | | |
|---|---|---|
| 7,918,784 B2 | 4/2011 | Wellborn et al. |
| 8,672,960 B2 | 3/2014 | Briganti et al. |
| 8,827,893 B2 | 9/2014 | Mirza et al. |
| 8,951,273 B1 | 2/2015 | Fard |
| 8,992,424 B2 | 3/2015 | Orbay et al. |
| 10,357,271 B2 | 7/2019 | Gitman |
| 10,966,743 B2 | 4/2021 | Cushen et al. |
| 2009/0247828 A1 | 10/2009 | Watanabe et al. |
| 2015/0320436 A1* | 11/2015 | Agee ................ A61B 1/00087 600/104 |
| 2017/0042565 A1 | 2/2017 | Ellsworth et al. |
| 2019/0159797 A1* | 5/2019 | Seymour ................ A61B 17/17 |
| 2019/0167293 A1* | 6/2019 | Seymour ........ A61B 17/320036 |

* cited by examiner

INTEGRATED ENDOSCOPIC LIGAMENT RELEASE DEVICE WITH DUAL HANDLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The disclosed device concerns surgical instruments employed in minimally invasive surgery. More particularly, the disclosed device and method relate to an apparatus and method employable as a guide for a cooperatively configured cutting member, for cutting anatomic members, such as ligaments, during minimally invasive surgical procedures.

This disclosure pertains to methods, apparatus, and systems for performing endoscopic ligament release surgery, such as carpal tunnel release, plantar fasciotomy, gastrocnemius release, cubital tunnel release, and tarsal tunnel release surgery, and similar surgical procedures on anatomic members.

Description of the Related Art

Many surgical procedures on patients, for correction of an injury or a problem brought about by disease, are performed using minimally invasive techniques where surgical implements are positioned within the patient's body and guided by the surgeon using a video depiction of the surgical site. Such procedures generally require the surgeon to make incisions or cuts for removing, releasing, or relocating body tissue, for instance, surgery for ulnar nerve release in the cubital tunnel or for a carpal tunnel release (also known as carpal tunnel decompression surgery). In these and similar surgeries, the goal is to cut an adjacent ligament without damaging any proximate nerves, blood vessels, muscle or body tissue. Because of the number of tools used and the care required to safely move and operate them, many procedures require the surgeon to use two hands and/or enlist assistant(s) for manipulating and holding the instruments.

Carpal tunnel syndrome occurs when the median nerve is compressed where it passes through the carpal tunnel, thereby causing insanguination of the nerve, which leads to numbness, a cold feeling, and/or pain in the hand and fingers. The carpal tunnel is an anatomic passageway at the base of the wrist through which the median nerve and the flexor tendons for the fingers of the hand pass. It is defined by the carpal bones of the hand and the transverse carpal ligament. Carpal tunnel syndrome is commonly caused by highly repetitive hand motions over a number of years. For instance, carpal tunnel syndrome is common in certain professionals such as secretaries and other professionals who type on a keyboard regularly, carpenters, dentists or anyone who performs the same hand motions repeatedly and regularly.

The current standard of care for alleviating carpal tunnel syndrome is to incise the transverse carpal ligament to open up the carpal tunnel and release the pressure on the median nerve. With few exceptions, most people can manage daily activities with a severed transverse carpal ligament with almost no adverse effects.

The particular current procedure for carpal tunnel release is an endoscopic or arthroscopic procedure in which an incision is made in the wrist proximal of the carpal tunnel. An endoscope with a camera is inserted into the incision and through the carpal tunnel to allow the surgeon to visualize the carpal tunnel, and, particularly, the transverse carpal ligament, and then a knife is inserted alongside the endoscope to cut the transverse carpal ligament.

Such procedures generally include endoscopic or arthroscopic procedures for entering the patient and severing a ligament or other body tissue which is causing the patient harm or pain, with an antegrade knife, retrograde knife, or other blade as shown in U.S. Pat. No. 5,651,790. Herein lies a significant shortcoming in prior arts, as visibility for the surgeon performing this delicate procedure is minimal since it consists of a display on a video screen of the site which is captured by a small lens at the distal end of a fiber optic or other electronic transmission line.

The depicted surgical site is also shown in a somewhat unnatural orientation and under artificial light projected from the same, a coaxial fiberoptic line, or any other suitable solution. However, concurrently, the need for surgical precision and the surgeon's confidence in their movement to make incisions and cut tissue with great accuracy is paramount.

Positioning of the blade or knife, which the surgeon will employ for severing the ligament or other tissue causing the problem, requires the employment of a guide. The guide is either inserted first to form a pathway for the knife to the site of the internal surgery, or inserted concurrently with the knife engaged within the guide. The guide provides a shield around the sharp portions of the blade during transition to the surgical site.

Additionally, conventional planar guides with channels for a cabled imaging component and surgical blades or knives can only form a pathway through tissue the height of the sidewall of the guide. Body tissues, however, are quite pliable and incisions running though skin and fat layers tend to collapse once cut and impede translation of the guide into position within the body of the patient. Further, during such translation the exposed side of the blade can cause incisions and other damage to body tissues since those tissues tend to bias or deform against the open channels formed in the guide.

As such, there is a continuing unmet need for an improved surgical guide device with formed pathways for both a surgical knife or blade, and for translation of the imaging component for communicating the video or other visual depiction of the surgical site from the image capturing device. Such a device should provide the appropriate adjacent channels for the surgical blade and imaging component in a manner which prevents tissue contact against the blade and the imaging component. Further, such a device should be employable by the user to widen or enlarge passages through which it needs to translate when needed. Still further, such a device should be capable of use by a single surgeon, using either hand to activate the various functions such as advancing the probe, using the blade, and operating the imaging component.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

Disclosed herein are methods, apparatuses, and systems for cutting anatomic members, such as ligaments, in surgical procedures such as carpal tunnel release, plantar fasciotomy, gastrocnemius release, cubital tunnel release, and tarsal tunnel release. The apparatus may be a fully integrated endoscopic release device that includes two handles, thereby allowing the surgery to be performed by a single right-handed or left-handed surgeon.

The handles may be attached to a probe containing a retrograde and/or antegrade and/or dual sided cutting member, blade, or knife and an imaging device, as well as a probe for guiding the cutting member and imaging device during surgery. Additional relevant features may include a stop for preventing the cutting member from inadvertently raising out of the cutting member channel, indicators showing the proper orientation for the probe, and a self-dilating tip and channel design on the probe.

In some implementations, an integrated endoscopic ligament release device includes two proximal handles each sized for a surgeon's hand and a distal probe attached to the handles, where the two handles are in fixed relative positions and the probe contains a distal cutting member and an imaging device. The two handles can be fixed with respect to each other and with respect to the probe, and can be symmetric to each other. Two handles can be fixed together at an angle of 120-180 degrees. Each handle can include a button configured to operate the imaging device, and can alternatively or additionally include a trigger configured to operate the cutting member. The device can be used by a left-handed or right-handed operator. The cutting member can a knife and/or the imaging device can be a camera.

The probe can include an elongate body with a proximal end attached to the handles and a distal end with a rasp, and the distal end of the probe can be transparent, white, and/or black. The cutting member and imaging device can be carried or received side-by-side in the probe, where the cutting member and imaging device can be separated by a septum. The septum can be configured and arranged to not obscure a view to the imaging device. The cutting member can be activated by a cutting linkage, which can optionally be configured and arranged to not obscure a view to the imaging device. The probe can include an elongate body with a flat palmar side and an opposed dorsal side with a rounded shape.

In some implementations, an integrated endoscopic ligament release device includes two proximal handles each sized for a surgeon's hand and a distal probe attached to the handles, where the two handles are in fixed relative positions and the probe contains a distal cutting member. An imaging device can be received in and/or guided by the probe. The two handles can be fixed with respect to each other and with respect to the probe, and can be symmetric to each other. Two handles can be fixed together at an angle of 120-180 degrees. Each handle can include a button configured to operate the imaging device, and can alternatively or additionally include a trigger configured to operate the cutting member. The device can be used by a left-handed or right-handed operator. The cutting member can a knife and/or the imaging device can be a camera.

The probe can include an elongate body with a proximal end attached to the handles and a distal end with a rasp, and the distal end of the probe can be transparent, white, and/or black. The imaging device can be received next to or alongside the cutting member in the probe, where the cutting member and imaging device can be separated by a septum. The septum can be configured and arranged to not obscure a view to the imaging device when the imaging device is received in the probe. The cutting member can be activated by a cutting linkage, which can optionally be configured and arranged to not obscure a view to the imaging device when the imaging device is received in the probe. The probe can include an elongate body with a flat palmar side and an opposed dorsal side with a rounded shape.

In some implementations, a method of using an integrated endoscopic ligament release device includes steps of inserting the ligament release device into a target anatomy for an endoscopic ligament release surgery, placing a distal end of the ligament release device near a ligament to be released, and using a cutting member to cut one or more anatomical structures to release the ligament, where the ligament release device can be a disclosed integrated endoscopic ligament release device The surgery can be a carpal tunnel release, plantar fasciotomy, gastrocnemius release, cubital tunnel release, or tarsal tunnel release surgery.

BRIEF DESCRIPTION OF THE DRAWINGS

The foregoing and other features, aspects, and advantages of the embodiments of the systems, apparatuses, and methods described herein are described in detail below with reference to the drawings of various embodiments, which are intended to illustrate and not to limit the embodiments of the invention. The drawings comprise the following figures in which.

Throughout the drawings, unless otherwise noted, reference numbers may be re-used to indicate a general correspondence between referenced elements. The drawings are provided to illustrate example embodiments described herein and are not intended to limit the scope of the disclosure.

DETAILED DESCRIPTION

Examples and/or embodiments disclosed herein relate to systems, devices, and methods for cutting certain tissues, such as ligaments via various surgical techniques, not limited to carpal tunnel release, plantar fasciotomy, gastrocnemius release, cubital tunnel release, and tarsal tunnel release.

In certain embodiments, a fully integrated endoscopic release device may include two handles attached to a probe containing a cutting blade and an imaging component. The two handles may be fixed with no relative movement in an angled arrangement. Each handle may include a trigger for activating the cutting blade and a button for controlling the imaging device. Each device may be suitable for use by a right-handed or left-handed surgeon.

Figure 1:
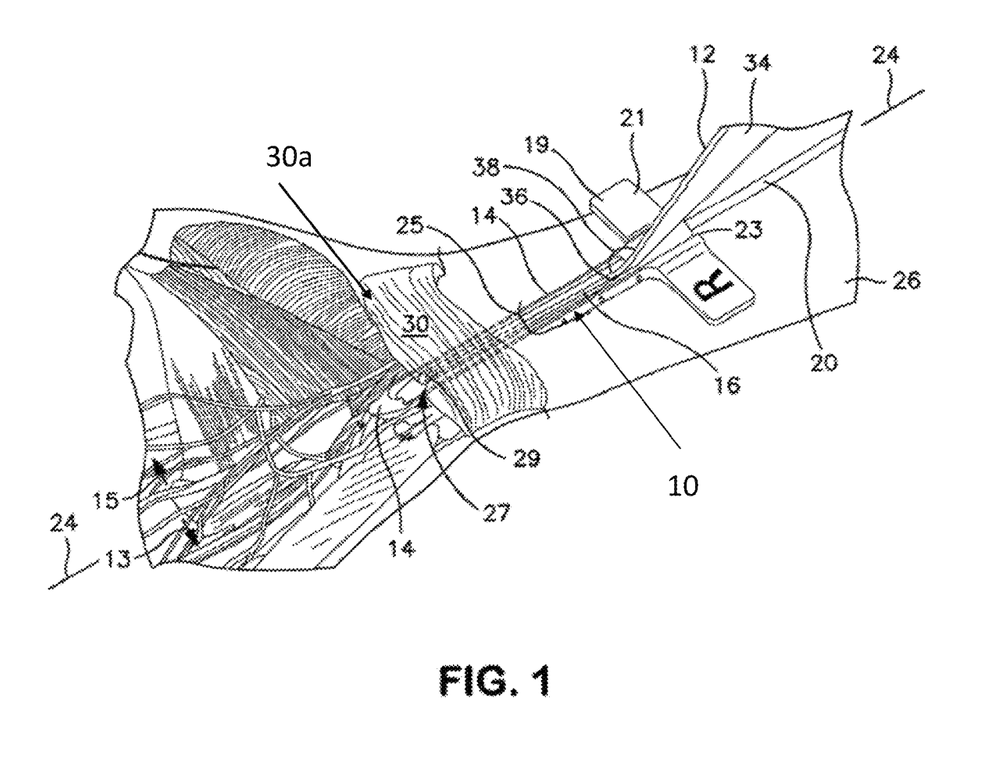
FIG. 1 is a diagram illustrating use of one particular endoscopic carpal tunnel release apparatus and method in accordance with the prior art.

Referring to FIG. 1, one system available on the market today is the SEG-Way system offered by Trice Medical, Malvern, PA, USA. The SEG-Way system may include, among other things, a guide 10 and a retrograde knife 12. As seen in FIG. 1, the guide 10 compromises a longitudinal member 14 containing a channel 16. The channel 16 is for receiving an endoscope 20 and the knife 12 side-by-side. A key feature of the SEG-Way system is that the endoscope and knife are entirely independently manipulatable. The guide further comprises a transverse member 19 at its proximal end comprising two wings 21 and 22 extending in opposition transverse directions from the proximal end 23 of the longitudinal member 14. In examples, the wings 21, 22 provide a place for the surgeon to hold the guide as well as some stability against rotation about the longitudinal axis 24 of the longitudinal member because the wings essentially rest upon the forearm 26 of the person after the guide has been inserted through the incision 25.

In certain examples, device can be used for carpal tunnel surgery on a wrist having a carpal tunnel 29 and transverse carpal ligament 30 with a radial (thumb) side 15 and an ulnar (fourth finger or "pinky" side) 13. The incision 25 may be made in the wrist proximal to the carpal tunnel 27 and the longitudinal member 14 of the guide 10 is advanced distally into and through the carpal tunnel, thereby dilating the carpal tunnel. Once the guide 10 is fully inserted and through the carpal tunnel 27, the endoscope 20 may be advanced through the first channel 16 to allow the surgeon to see the carpal tunnel, and particularly, the transverse carpal ligament 30. Then, the knife 12 is advanced distally within the channel 16. As can be seen in FIG. 1, in some examples, the knife may include a handle 34 and a distal segment 36 disposed at an angle 38 to each other and has a hooked, retrograde blade 29 at the distal end of the distal segment 36 that faces proximally and cuts when the knife is pulled back in the proximal direction. The angled junction 38 between the handle 34 and the distal segment 36 of the knife 12 may define a pivot point about which the knife will be rotated after insertion and prior to cutting. More particularly, the knife 12 may be inserted into the channel 16 with the distal segment 36 lying flat in the channel 16 and flush against the bottom of the channel with the blade 29 concealed inside the channel 16 until it is past the transverse carpal ligament so as not to contact any anatomy. This inherently means that the handle segment 34 will be angled upwardly. Then, the surgeon may push down on the handle to cause the distal segment, and particularly, the retrograde blade to rise up out of the channel 16 so that it can engage the distal edge 30a of the transverse carpal ligament 30 and cut it by drawing the knife 12 back in the proximal direction.

Figure 2:
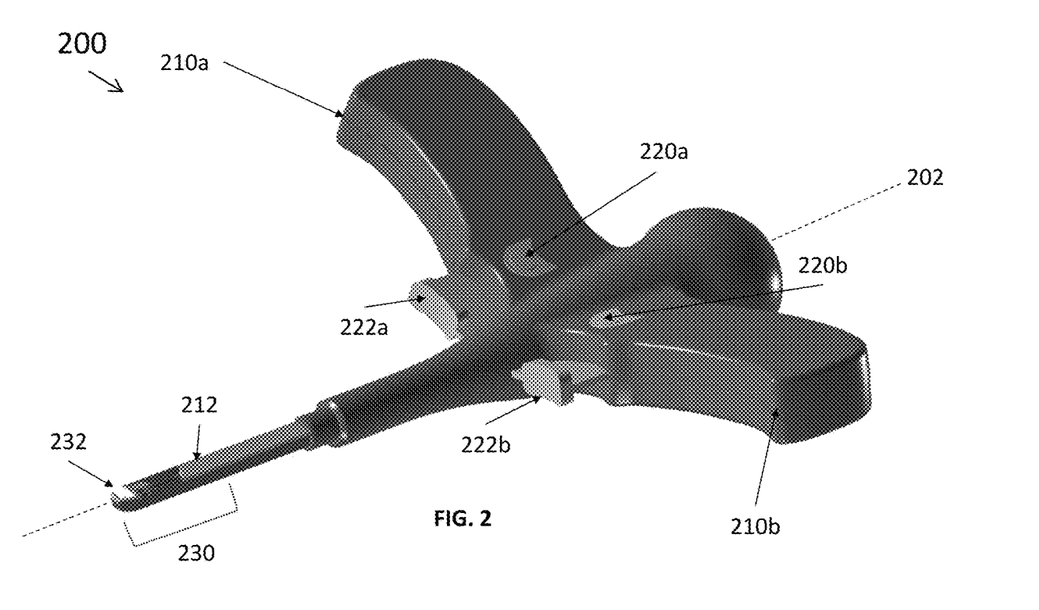
FIG. 2 shows an isometric view of an integrated endoscopic ligament release device according to one implementation.

FIG. 2 is a perspective view from a distal side of an example of an integrated endoscopic ligament release device 200 with dual handles according to one implementation. As illustrated in FIG. 2, device 200 includes two proximal handles 210a and 210b fixed together with no relative movement between each handle 210a, 210b. In some implementations, the two handles 210a, 210b are symmetric and fixed about the longitudinal axis 202 of the device 200. In some implementations, the handles are fixed with an angle between the handles of 90-180 degrees. The handles can each be sized for a surgeon's hand, thereby enabling use of the device by a single preferred hand (e.g., a right-handed surgeon's right hand or a left-handed surgeon's left hand) of a single surgeon.

Each handle 210a, 210b includes a respective imaging button 220a, 220b and a cutting member trigger 222a, 222b. The positions of the imaging buttons 220a and 220b as well as cutting member triggers 222a and 222b on each respective handle 210a and 210b are accessible to the surgeon with the preferred operating hand. For example, a right-handed surgeon can operate the device 200 with the right handle 210a, including the right imaging button 220a and right cutting member trigger 222a while a left-handed surgeon can operate the device 200 with the left handle 210b, including the left imaging button 220b and left cutting member trigger 222b. The handles 210a, 210b are attached to a probe 212 with an elongate body extending generally along the longitudinal axis 202. The probe 212 extends to a distal end 230. In some implementations, distal end 230 includes a rasp 232.

Imaging buttons 220a and 220b operate an imaging device within the probe 212. In some implementations, the imaging device is a digital camera, a cabled video camera, endoscope, and the like, with or without a light source. The imaging buttons 220a, 220b can be configured to operate the imaging device via software. For example, in some implementations, imaging button 220a, 220b can be configured to take a photo, take a series of burst photos, start a video, stop a video, turn on a light source, and/or turn off a light source. In some implementations, an imaging button 220a or 220b can be configured to perform multiple functions by pressing the imaging button 220a, 220b for a short time (e.g., momentary click), pressing for a longer time (e.g., long press or long click), holding the imaging button 220a, 220b (e.g., hold to illuminate and/or capture video and release to turn off a light and/or stop video), pressing twice (e.g., double press or double click), and other arrangements of pressing and/or holding the imaging button 220a, 220b. In some implementations, a light source and imaging device are automatically activated together. In most implementations, the imaging buttons 220a and 220b operate identically, thereby allowing the surgeon to use the device with a single preferred hand. In some implementations, the non-preferred imaging button is redundant, and in some implementations the non-preferred imaging button is deactivated or locked to prevent accidental activation.

Figures 3A, 3B:
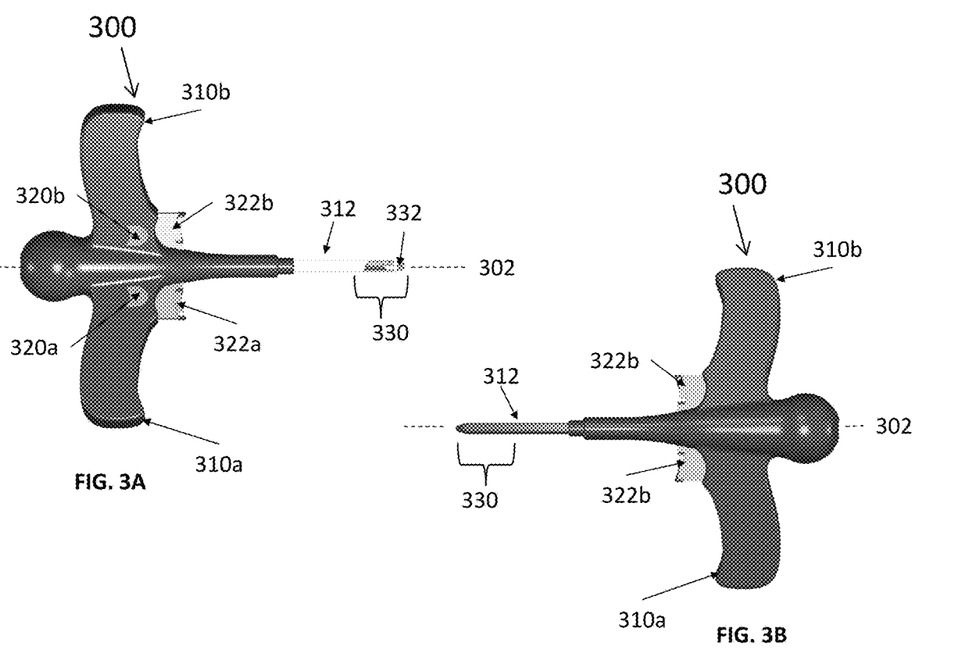
FIG. 3A shows a top view of an implementation of the integrated endoscopic ligament release device.
FIG. 3B shows a bottom view of an implementation of the integrated endoscopic ligament release device.

FIGS. 3A-3F illustrate various views of an implementation of an integrated endoscopic ligament release device 300. Device 300 can be the similar or identical to device 200 in some or all respects, including two symmetrical handles 310a and 310b fixed about a longitudinal axis 302. Each handle 310a and 310b may carry a respective imaging button 320a, 320b and a respective cutting member trigger 322a, 322b. Probe 312 may be attached at a proximal end to the handles 310a and 310b, and extends along the axis 302 to a distal end 330. FIG. 3A shows a view from the top of the device 300, where imaging buttons 320a and 320b are located. Imaging buttons 320a and 320b may be arranged on the handles 310a and 310b to be accessed by the thumb of the surgeon's preferred hand. Cutting member triggers 322a and 322b, shown in FIGS. 3A-C and 3E-F, are located on a distal side of each handle 310a and 310b. The cutting member triggers 222a, 222b, 322a, and 322b can be arranged to be accessed by an index and/or middle finger of the surgeon's preferred hand, as illustrated on devices 200 and 300. In some implementations, the cutting member triggers 322a, 322b each extend to an end of the respective handle 310a, 310b to be accessed by up to four fingers of the surgeon's preferred hand. In some implementations, handles 310a, 310b, imaging buttons 320a, 320b, and cutting member triggers 322a, 322b have a symmetric design for use by a right-handed or left-handed surgeon.

Figure 3C:
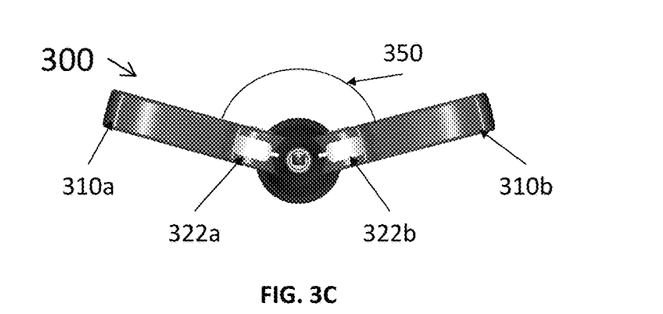
FIG. 3C shows a view from a distal end of an implementation of the integrated endoscopic ligament release device.
Figure 3D:
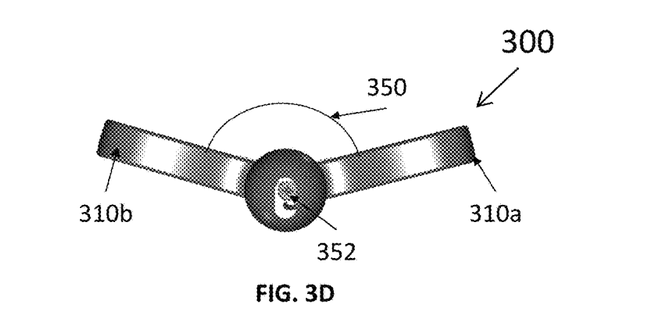
FIG. 3D shows a view from a proximal end of an implementation of the integrated endoscopic ligament release device.

As shown in the proximal and distal end view of FIGS. 3C and 3D, the handles 310a and 310b may be fixed to each other at an angle 350 about the longitudinal axis 302. In some implementations, the angle may be 350 is 90-180 degrees (e.g., 90-110 degrees, 90-160 degrees, 110-160 degrees, 120-140 degrees, 100-150 degrees, 120-180 degrees, overlapping ranges thereof, or any value within the recited ranges). In some implementations, the handles 310a, 310b are symmetrically arranged with an axis of symmetry along the longitudinal axis 302.

In some implementations, the proximal side of the device 300 includes a connector 352, as shown in FIG. 3D. Connector 352 can be used to provide one or more connections to power, a computer system, laptop, tablet, display, controller, and/or other appropriate device. As illustrated in FIG. 3D, the connector 352 may be located along the longitudinal axis 302 to advantageously preserve the symmetry of the device 300 and handles 310a, 310b. In some implementations, other connector locations, such as the top, bottom, or handles 310a, 310b may be used. In some implementations, the connector 352 is a standard connector, such as a barrel, pin, plug, DIN, USB (e.g., USB-A, USB-C, mini-USB, etc.), and the like. In some implementations, the connector 352 is a custom connector. In some implementations, the connector 352 is a locking connector (e.g., BNC, RJ11, RJ45). In some implementations, the connector 352 also includes a cover for use when the device 300 is disconnected.

Figure 3E:
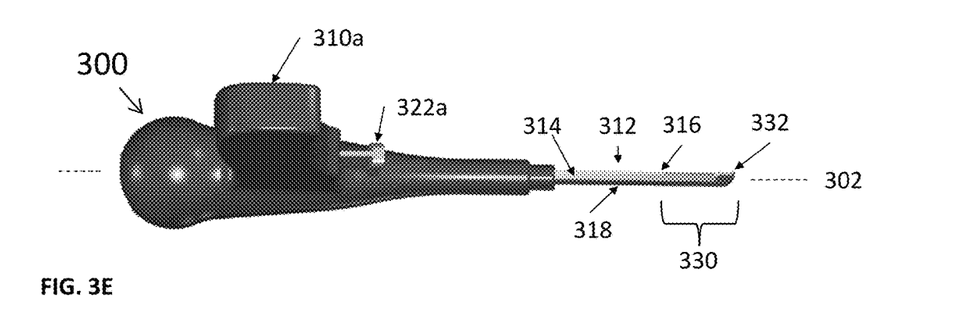
FIG. 3E shows a view from a right side of an implementation of the integrated endoscopic ligament release device.
Figure 3F:
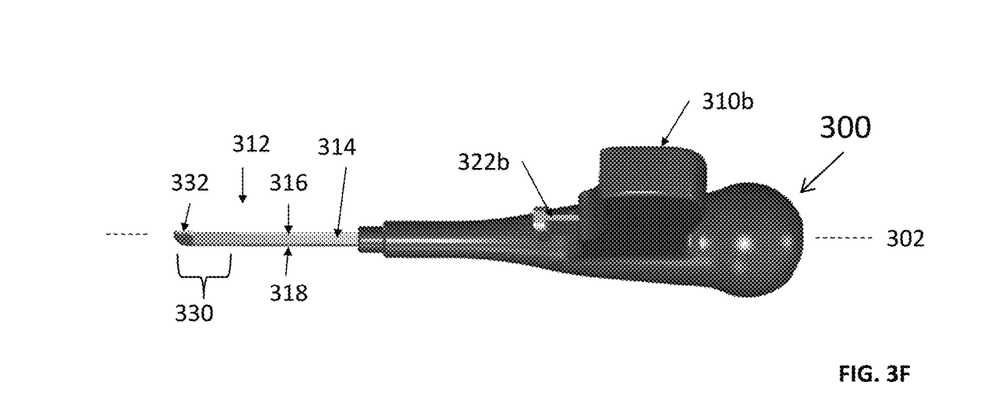
FIG. 3F shows a view from a left side of an implementation of the integrated endoscopic ligament release device.

FIGS. 3E and 3F show side views of the integrated endoscopic ligament release device 300, including handles 310a and 310b, cutting member triggers 322a and 322b, and probe 312 extending along longitudinal axis 302. As shown, the probe 312 includes an elongate body 314 connecting from the handles 310a, 310b at a proximal end, along the longitudinal axis 302 to a distal end 330. The distal end 330 includes a rasp 332. The elongate body 314 has a flat upper or palmar surface 316, and a generally rounded lower or dorsal surface 318 opposed to the upper surface. In some implementations, the elongate body has a D-shaped cross-section, though other shapes, such as U-shaped, C-shaped, circular, oval, or ovate and the like may be appropriate. In some implementations, the length of elongate body 314 can be selected according to the procedure and/or patient needs. For example, the length of the elongate body 314 for a probe 312 designed for a gastrocnemius procedure can be longer than the length of the elongate body 314 for a probe 312 designed for a carpal tunnel procedure. In some implementations, the probe 312 can include an elongate body 314 with a length of about 0.5-20 cm, (e.g., about: 1.0-20 cm long, 3-8 cm long, 2-6 cm long, 5-10 cm long, 0.5-3 cm long, 17-20 cm long, 5-7 cm long, overlapping ranges thereof, or any value within the recited ranges).

In some implementations, markings are molded into or marked on the top (palmar) surface 316, around the outside of elongate body 314, or other location on or near probe 312. In some implementations, the markings may indicate an insertion depth, such as length markings (e.g., millimeters, centimeters, inches, fractions thereof, or other appropriate measures) from the distal end 330. In some implementations, the markings include angular measurements or rotation indicators (e.g., a line marking the palmar side) to assist the surgeon for proper placement and/or rotation of the probe 312 into anatomy while the distal end 330 is no longer visible.

Figure 4:
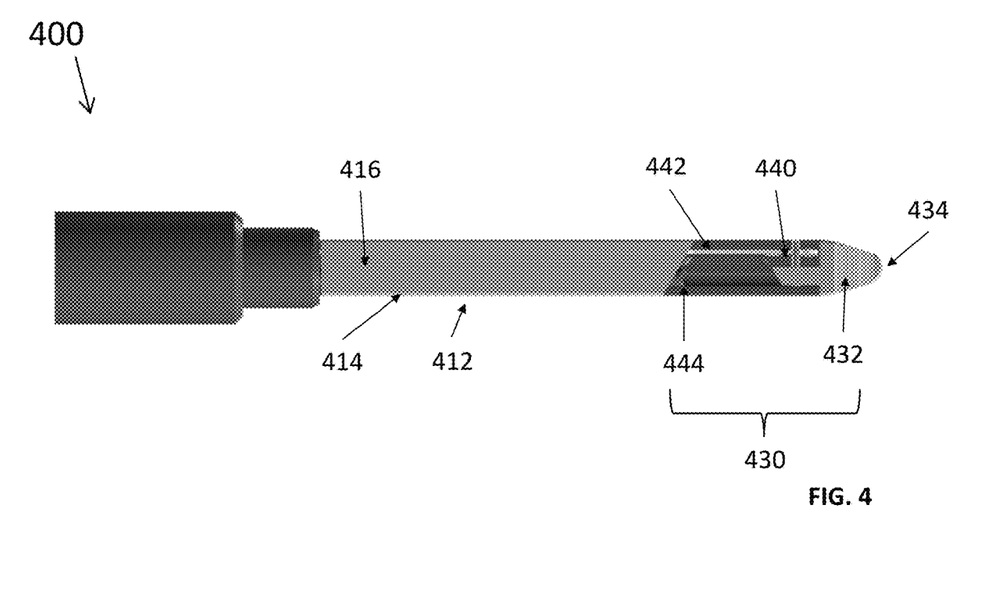
FIG. 4 shows one implementation of a distal working end of the integrated endoscopic ligament release device.
Figure 6A:
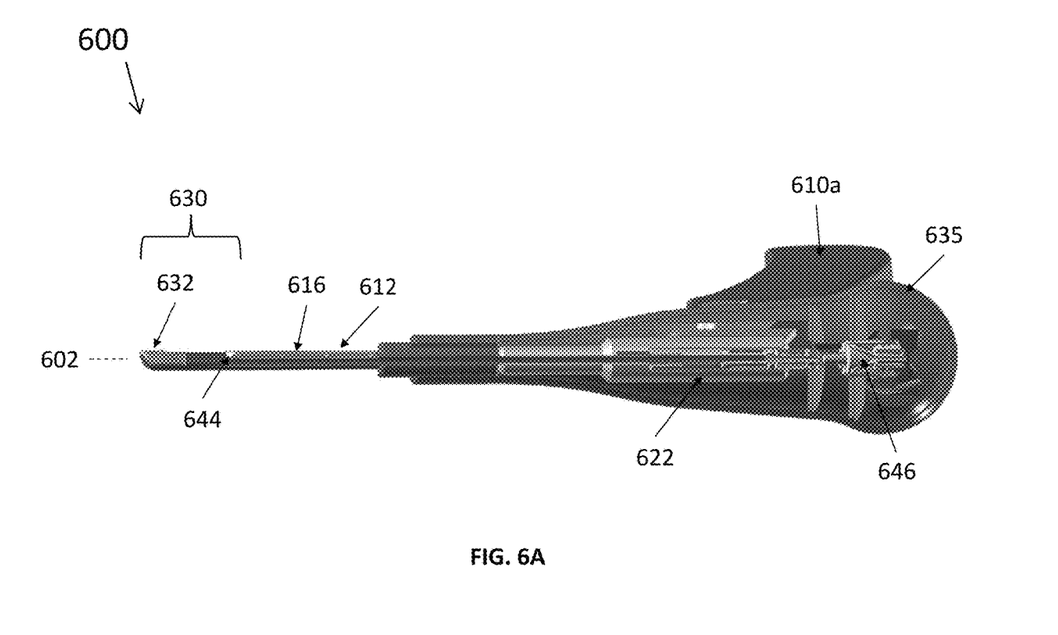
FIG. 6A illustrates a side view of internal components of the integrated endoscopic ligament release device according to one implementation.

FIG. 4 illustrates an implementation of a probe 412 of a device 400, which can be similar or identical to probes 212, 312 above. Probe 412 includes a generally elongate body 414 and a distal end 430 with a rasp 432. A top (palmar) side 416 of the probe 412 is substantially flat, as shown in FIGS. 3E, 3F, and 6A. The distal end 430 of the probe 412 can include a distal tip 434 for leading the probe into and through anatomy, such as the carpal tunnel. The carpal tunnel is rather tightly packed with flexor tendons and the median nerve. Accordingly, tip 434 is shaped to better assist in dilating the carpal tunnel to create room for the probe 412 to pass through the carpal tunnel. In certain implementations, the tip may spread the various flexor tendons and the medial or radial nerve.

In some implementations, the distal tip 434 of the probe 412 is prow shaped in order to ease the insertion of the distal tip 434, and therefore the distal end 430, of the probe 412 into the carpal tunnel and to assist in the dilation of the carpal tunnel to allow the probe 412 to pass through the carpal tunnel. As can be seen, the distal tip 434 is shaped like the prow of a boat with angled sides and a flat top. Particularly, it is pointed without being sharp, and it is curved upward slightly. In some implementations, the integrated endoscopic ligament release device 200, 300, can also be used with dilators, elevators, and other surgical tools to assist in proper placement.

Probe 412 contains and guides a cutting member 440 and imaging device 444 within the elongate body 414. Cutting member actuating linkage 442 operates to extend the cutting member 440 from the palmar side 416 of the elongate body 414 with a cutting member trigger (e.g., 222a, 222b, 322a, 322b). As discussed above, imaging device 444 may be operated with an imaging button (e.g., 220a, 220b, 320a, 320b) as discussed above. In some implementations, the cutting member 440 and imaging device 444 are relatively fixed and move together with the probe 412 for placement and operation. In some implementations, the cutting member 440 and/or imaging device 444 are independently movable. For example, in some implementations, the probe 412 and cutting member 440 are inserted into the target anatomy and held in position, and then the imaging device 444 is inserted or moved within the probe 412 to obtain a view of the cutting area. The imaging device 444 may be slidable and/or rotatable within the probe 412, and may further be optionally locked into a position.

In many procedures, it is desirable to arrange the imaging device 444 and/or cutting member 440 on a particular side of the probe. In some implementations, for example, the imaging device 444 is advantageously positioned above or below the cutting member 440. In some implementations, the imaging device 444 is advantageously next to the cutting member 440. In particular, it can be advantageous to place the imaging device 444 to the left or right of the cutting member 440. For example, in carpal tunnel surgery, it is desirable to have the imaging device 444 on the radial side and the cutting member 440 on the ulnar side because the probe 412 is inserted to the ulnar side of the medial nerve. This places the probe 412 against the medial nerve, which is preferred because it separates the medial nerve from the cutting member 440 for extra safety in avoiding accidental nicking of the medial nerve with the cutting member 440. Accordingly, it is desirable to provide different probes, handles, and/or devices for surgery performed on the right hand and the left hand.

The cutting member 440 and imaging device 444 can be contained in the probe 212, 312, 412. In one implementation, illustrated in FIG. 5, device 500 can include an imaging device 544 that can be carried in an imaging channel 560 of the elongate body 514 of a probe 512. The imaging device 544 can be located in the distal end 530 and directed upward toward the flat planar surface of the top or palmar side 516 of the probe 512. Imaging device 544 does not necessarily extend to the distal tip 534, but may in certain examples. This slightly proximal location allows the imaging device 544 to visualize the target anatomy. In some implementations, the imaging device 544 is movable within the imaging channel 560 at the distal end 530 of the probe 512. For example, imaging device 544 can slide along the length of the imaging channel 560 (e.g., along axis 502) to visualize a different portion of the anatomy or provide a wider viewing angle. Additionally, or alternatively, imaging device 544 can be rotated within the imaging channel 560 to adjust the captured image and/or visualize adjacent anatomical structures.

Figure 5:
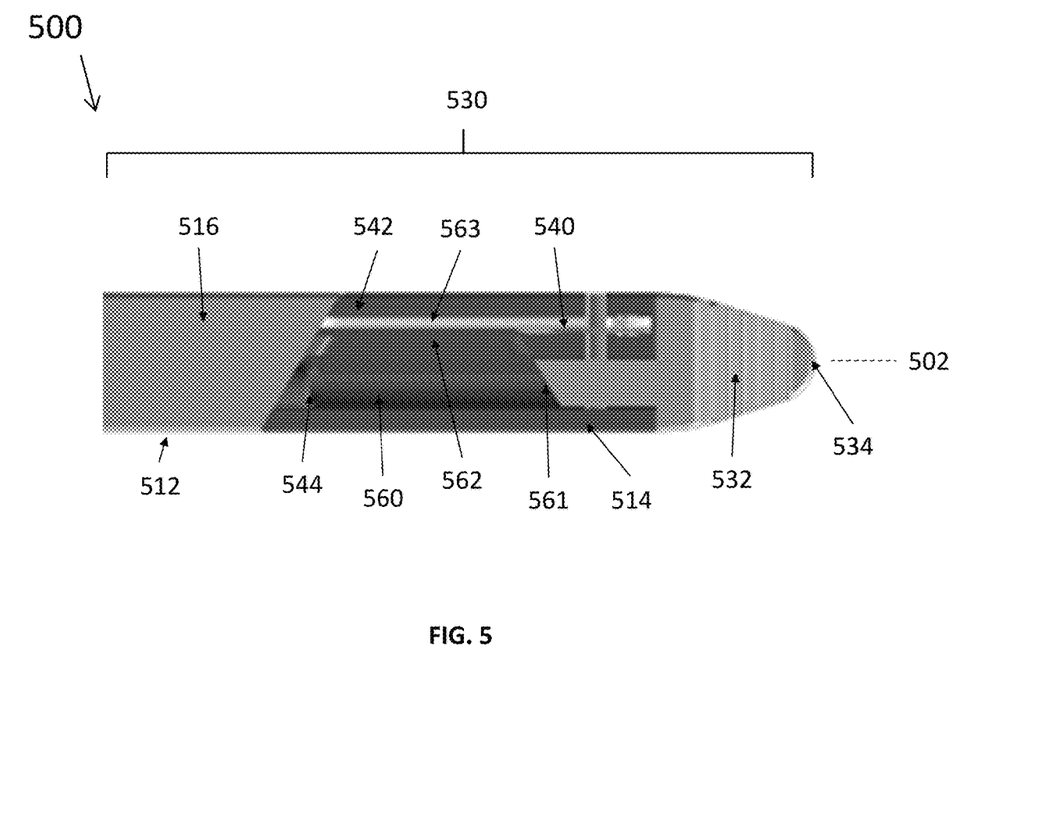
FIG. 5 shows one implementation of the distal working end of the integrated endoscopic ligament release device.

Imaging channel 560 can include a distal end wall 561. In some implementations, the end wall 561 is 90 degrees or flat. In some implementations, the end wall 561 can be angled, as illustrated in FIG. 5. An angled end wall 561 can be used to prevent or minimize unwanted reflection of light from the imaging device 544 (e.g., light reflection back into the imaging device 544) and/or direct light from the imaging device 544 toward the target anatomy. In some implementations, the distal end 530 of the elongate body 514 can made with colors and/or materials to further enhance the image collected by imaging device 544. For example, the distal end 530 may be clear or transparent to allow visualization of anatomy on a different surface (e.g., the bottom, left, and/or right sides away from the flat top surface 516), dark or black to reduce light reflections, and white to increase light scattering for increased illumination. In some implementations, the distal end 530 includes regions of one or more of these surfaces to produce a desired overall illumination and imaging field. In some implementations, the distal end 530 is made of any suitable material, such as molded plastic, metal tubes and/or sections, polymers, composites, and the like. In some implementations, the distal end 530 is a laminate structure, for example a molded clear plastic tubing section with additional layers for creating highly reflective or scattering regions (e.g., white layer) and/or non-reflective regions (e.g., black layer).

Cutting member 540 can also be carried in the elongate body 514 of probe 512. The cutting member 540 is fully or partially enclosed by the elongate body 514 while the device 500 is directed to the target anatomy (e.g., while the rasp 532 and distal tip 534 are used to position the cutting member 540 and imaging device 544 near the target ligament). Once positioned, the cutting member trigger (e.g., 222a, 222b) can be used to raise the cutting member 540 out of the elongate body 514 via cutting member actuating linkage 542. Actuating linkage 542 can pivot or rotate the cutting member 540 to raise a cutting edge, which can then be used by the surgeon to perform the procedure. Actuating linkage 542 can optionally include a lowered portion 563, where the height of the actuating linkage 542 is lowered to avoid interference with the imaging device 544. The lowered portion 563 can help prevent unwanted reflecting of light and/or obscuring of the view of the imaging device 544.

Cutting member 540 and imaging device 544 can be separated by a septum 562, extending at least partially along the length of the elongate body 514 in the same direction as the longitudinal axis 502. In some implementations, some or all of the septum 562 between the cutting member 540 and the imaging device 544 in the distal end 530 can be shortened and/or removed to avoid interference with the imaging device 544. This lowered portion (not shown) can help prevent unwanted reflecting of light and/or obscuring of the view of the imaging device 544. Portions of the septum 562 in the distal end 530 may alternatively or additionally include angled ends to further reduce unwanted obscuring and/or reflecting.

As discussed above, cutting member 540 and imaging device 544 can be generally fixed within the elongate body 514 of a probe 512. In some implementations, the cutting member 540, imaging device 544, or both are removable and insertable within the probe 512. In some implementations with a removable cutting member 540, the cutting member 540 is received in a cutting channel, which may be similar to imaging channel 560. The cutting channel and imaging channel 560 can be separated by a septum, which may be similar to septum 562 in some or all respects. As discussed above, the septum 562 can help prevent the cutting member 540 from interfering with and/or damaging the imaging device 544, and can help hold the cutting member 540 and imaging device 544 in a fixed orientation. The optional cutting channel can further enhance safe operation of a removable cutting member 540. For example, a cutting channel can include an end wall that forms an angle with the bottom of the cutting channel. The angle of the end wall may be a right angle (90 degrees) or an acute angle so that engagement of the cutting member 540 with the end wall (e.g., from unintended axial force and/or twisting) applies a downward force to the cutting member 540, thus pushing the cutting member 540 down into the cutting channel and away from anatomy.

Figure 6B:
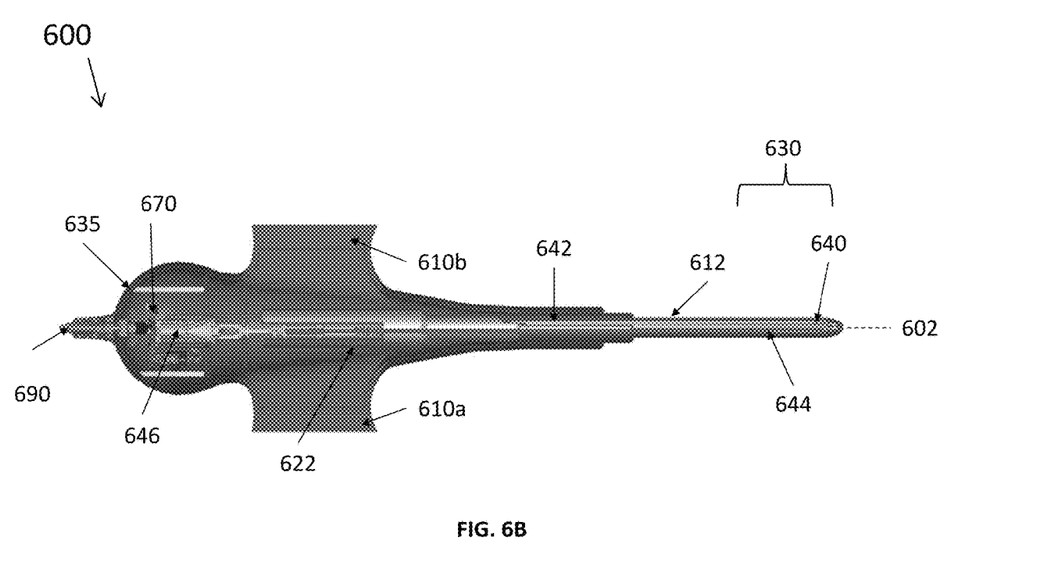
FIG. 6B illustrates a top view of internal components of the integrated endoscopic ligament release device according to an implementation.

FIGS. 6A and 6B illustrate partial views of an implementation of an integrated endoscopic ligament release device 600, which may be similar or identical to ligament release devices 200, 300, 500 above in some or all respects. Integrated endoscopic ligament release device 600 may include handles 610a and 610b and probe 612 with a palmar surface 616 and rasp 632 at a distal end 630. At a proximal end along longitudinal axis 602 is an enlarged area 635 between the handles 610a, 610b. This area 635 may house proximal components 646 of an imaging device 644, which may be an integrated camera assembly with illumination in some implementations. Imaging device 644 can be a cabled imaging device, where a cable runs along probe 612 (for example, in channel 560) to connect the imaging device 644 at a distal end 630 of the probe 612, to proximal components 646 of the imaging device 644, where the proximal components 646 can be located in enlarged area 635. The proximal enlarged area 635 can also house a PCB assembly 670 and/or other circuitry of the system. In some implementations, the PCB assembly 670 includes components for an integrated camera assembly of the imaging device 644, including LED or other illumination and one or more external cable connections.

In some implementations, the imaging device 644 can include a cable 690 that exits the enlarged proximal area 635 for a connection to a power, computer system, laptop, tablet, display, controller, and/or other appropriate device. The cable 690 can include one or more separate or bundled cables and connections (e.g., multiple connections, a single cable, and/or a cable harness). As illustrated in FIG. 6B, the cable 690 exits along the longitudinal axis 602 to advantageously preserve the symmetry of the device 600 and handles 610*a*, 610*b*. In some implementations, other cable locations, such as the top, bottom, or sides of the enlarged area 635 may be used. In some implementations, the cable 690 may be replaced or augmented with one or more connections to power, a computer system, laptop, tablet, display, controller, and/or other appropriate device (e.g., a cable to a display for the imaging device 644 and a socket such as connector 352 shown in FIG. 3D for a data, control, and/or power connection).

As discussed above, in certain implementations the cutting member 640 is controlled by a cutting member trigger (222*a*, 222*b* 322*a*, 322*b*, etc.). In use, the surgeon squeezes or pulls a cutting member trigger 622 to deploy (raise) the cutting member 640. In some implementations, cutting member trigger 622 can be spring-loaded to hold the cutting member 640 within the probe 612. When a cutting member trigger 622 is active (e.g., squeezed), the cutting mechanism activates the cutting linkage 642 to raise the cutting member 640 for cutting. When the cutting member trigger 622 is inactive (e.g., released), a spring of the cutting member trigger 622 returns the cutting member 640 to the probe 612. In some implementations, the cutting member triggers 622 (222*a*, 222*b*, 322*a*, or 322*b*, etc.) operate identically, thereby allowing the surgeon to use the device with a single preferred hand. In some implementations, the non-preferred trigger is redundant, and in some implementations the non-preferred trigger is deactivated or locked to prevent accidental activation of the cutting member 640. In some implementations, both cutting member triggers 222*a* or 222*b* activate the same cutting mechanism 622. In some implementations, the cutting member triggers 222*a* or 222*b* include independent cutting mechanisms that independently operate the cutting linkage 642.

As discussed above, in some implementations, the cutting member trigger 622 requires a positive engagement from the surgeon to hold the cutting member 640 out of the probe 612 for cutting (e.g., squeezing a trigger 222*a* holds the cutting member 640 out of the probe 612 and releasing the trigger 222*a* returns the cutting member 640 to the probe 612). In some implementations, the cutting mechanism can be held or locked in place, for example to hold or lock the cutting member 640 in a cutting position outside the probe 612 and/or in a safe position inside the probe 612. The cutting mechanism can also be configured to activate the cutting linkage 642 by additional linkages, springs, pivots, cams, and the like, and can be configured to be activated by buttons, levers, switches, and the like instead of or in addition to the cutting member triggers 222*a*, 222*b*.

The cutting member 640 can be a knife, blade, saw, or other instrument capable of cutting the target anatomy. The cutting member 640 can be arranged for retrograde cutting (e.g., sharp on a proximally-facing side), antegrade cutting (e.g., sharp on a distally-facing side), or both (e.g., sharp on both sides). The cutting member 640 can be straight, curved, hooked, triangular, or any other appropriate shape.

In some implementations, the integrated endoscopic ligament release device provides the cutting member 640 and imaging device 644 integrated with the probe 612 and handles 610*a* and 610*b*. In some implementations, the integrated endoscopic ligament release device provides the cutting member 640 integrated with the probe 612 and handles 610*a* and 610*b*, while the imaging device 644 is removable. In some implementations, the imaging device 644 is insertable and removable through a proximal opening, such as a hole in the enlarged area 635.

As noted above, the integrated endoscopic ligament release device 200, 300, 500, 600 can be used with dilators, elevators, and other surgical tools. In some implementations, the integrated endoscopic ligament release device can be provided in a kit including a first set of sterile tools, a second set of tools, and a limb positioning device. In some implementations, the limb positioning device is a tray that may include a bottom tray configured to hold the first set of tools, a middle tray configured to hold the second set of tools, and a top tray comprising a recess configured to receive a patient's limb (e.g., hand) for the medical procedure. The first set of tools can include an integrated endoscopic ligament release device, guides, cutting members, and probes. The second set of tools can include a scalpel blade, a pair of scissors, forceps, a dilator and elevator tool, and a retractor. The bottom tray can include a plurality of recesses configured to receive each of the first set of tools. The middle tray can include a plurality of recesses configured to receive each of the second set of tools.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as processors, ASICs, FPGAs, and the like, can include logic circuitry. Furthermore, the features and attributes of the specific embodiments disclosed above may be combined in different ways to form additional embodiments, all of which fall within the scope of the present disclosure.

User interface screens illustrated and described herein can include additional or alternative components. These components can include menus, lists, buttons, text boxes, labels, radio buttons, scroll bars, sliders, checkboxes, combo boxes, status bars, dialog boxes, windows, and the like. User interface screens can include additional or alternative information. Components can be arranged, grouped, displayed in any suitable order.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

It will also be appreciated that conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments or implementations shown herein, but are to be accorded the widest scope consistent with this disclosure, the principles and the novel features disclosed herein.

What is claimed is:

1. An integrated endoscopic ligament release device comprising:
    two proximal handles each sized for a surgeon's hand, the two handles in fixed relative positions; and
    a distal probe attached to the handles, the probe containing a distal cutting member and an imaging device,
    wherein each handle includes a trigger configured to operate the cutting member.

2. The device of claim 1, wherein the two handles are fixed with respect to each other and with respect to the probe.

3. The device of claim 1, wherein the two handles are symmetric to each other.

4. The device of claim 1, wherein the two handles are fixed together at an angle of 120-180 degrees.

5. The device of claim 1, wherein each handle further includes a button configured to operate the imaging device.

6. The device of claim 1, wherein the probe comprises an elongate body with a proximal end attached to the handles and a distal end with a rasp.

7. The device of claim 1, wherein a distal end of the probe is at least one of transparent, white, or black.

8. The device of claim 1, wherein the cutting member and imaging device are side-by-side in the probe.

9. The device of claim 1, wherein the cutting member and imaging device are separated by a septum.

10. The device of claim 9 wherein the septum is configured not to obscure a view to the imaging device.

11. The device of claim 1, wherein the cutting member is activated by a cutting linkage.

12. The device of claim 11, wherein the cutting linkage is configured to not obscure a view to the imaging device.

13. The device of claim 1, wherein the probe comprises an elongate body with a flat palmar side and an opposed dorsal side with a rounded shape.

14. The device of claim 1, wherein the device can be used by a left-handed or right-handed operator.

15. The device of claim 1, wherein the cutting member is a knife.

16. The device of claim 1, wherein the imaging device is a camera.

17. An endoscopic ligament release device comprising:
    two proximal handles each sized for a surgeon's hand, the two handles in fixed relative positions; and
    a distal probe attached to the handles, the probe containing a distal cutting member and configured for receiving and guiding an imaging device,
    wherein each handle includes a trigger configured to operate the cutting member.

18. A method of using an integrated endoscopic ligament release device comprising:
    inserting the ligament release device into a target anatomy for an endoscopic ligament release surgery;
    placing a distal end of the ligament release device near a ligament to be released; and
    using a cutting member to cut one or more anatomical structures to release the ligament;
    wherein the ligament release device comprises the device of claim 1.

19. The method of claim 18, wherein the surgery is a carpal tunnel release, plantar fasciotomy, gastrocnemius release, cubital tunnel release, or tarsal tunnel release surgery.

20. An integrated endoscopic ligament release device comprising:
    two proximal handles each sized for a surgeon's hand, the two handles in fixed relative positions; and
    a distal probe attached to the handles, the probe containing a distal cutting member and an imaging device,
    wherein each handle includes a button configured to operate the imaging device.

* * * * *